United States Patent
Takemura et al.

(10) Patent No.: US 7,604,130 B2
(45) Date of Patent: Oct. 20, 2009

(54) FLAT MEMBRANE ELEMENT AND REGENERATION METHOD THEREOF

(75) Inventors: Kiyokazu Takemura, Chiyoda-ku (JP);
Kazuhiko Noto, Chiyoda-ku (JP);
Mitsuru Hatanaka, Matsudo (JP);
Takashi Fujimoto, Matsudo (JP);
Tatsuaki Tagashira, Matsudo (JP)

(73) Assignee: Hitachi Plant Technologies, Ltd., Tokyo (JP)

( * ) Notice: Subject to any disclaimer, the term of this patent is extended or adjusted under 35 U.S.C. 154(b) by 389 days.

(21) Appl. No.: 11/640,314

(22) Filed: Dec. 18, 2006

(65) Prior Publication Data

US 2007/0158254 A1    Jul. 12, 2007

(30) Foreign Application Priority Data

Jan. 6, 2006   (JP)   .............................. 2006-001684

(51) Int. Cl.
*B01D 29/00*   (2006.01)
*B01D 29/46*   (2006.01)
*B32B 43/00*   (2006.01)

(52) U.S. Cl. .................. 210/490; 210/321.84; 210/232; 210/483

(58) Field of Classification Search .................. None
See application file for complete search history.

(56) References Cited

U.S. PATENT DOCUMENTS

2003/0188427 A1   10/2003   Say et al.

FOREIGN PATENT DOCUMENTS

| JP | A 2000-107576 | 4/2000 |
| JP | 2000-202253 | * 7/2000 |
| JP | A 2005-279580 | 10/2005 |

* cited by examiner

*Primary Examiner*—Krishnan S Menon
*Assistant Examiner*—Benjamin Kurtz
(74) *Attorney, Agent, or Firm*—Oliff & Berridge, PLC

(57) ABSTRACT

To reuse support plate and to fix a membrane sheet by the same method both in a new product manufacturing and in regeneration. In a flat membrane element including a deposit fixed portion formed by lapping a membrane sheet performing solid-liquid separation onto a support plate supporting the membrane sheet and by emitting a laser to a circumferential edge of the membrane sheet to deposit fix the member sheet onto the support plate, and making an inside of the membrane sheet surrounded by the deposit fixed portion be a solid-liquid separating area; an embrocation having laser absorption property is applied on the surface of the membrane sheet of the deposit fixed portion. At the time of regeneration, such a portion of the membrane sheet that corresponds to the solid-liquid separating area is cut off and, after that, a new membrane sheet is lapped on the embrocation and the new membrane sheet and the embrocation are deposit fixed by a laser.

2 Claims, 7 Drawing Sheets

FLAT MEMBRANE ELEMENT AND REGENERATION METHOD THEREOF

BACKGROUND OF THE INVENTION

1. Field of the Invention

The present invention relates a flat membrane element and a regeneration method thereof, and specifically to, a flat membrane element used to filtrate water to be processed and a regeneration method thereof.

2. Description of the Related Art

A flat membrane element of this kind is set in water to be processed in a dipped manner and used to filtrate the water to be processed. FIG. 7 is a partial sectional view showing a general structure of a flat membrane element. A support plate 1 is formed such that a circumferential edge 2 thereof has a flame shape and a water passing portion 3 is formed in the inner portion thereof. A membrane sheet 4 is attached onto both the faces of the support plate 1, respectively. A suction port 5 is connected with the circumferential edge 2. In addition, the outer surface of the circumferential edge 2 and the membrane sheet 4 have a joint portion 6 formed by lapping each other. By effecting negative pressure in the suction port 5 or by effecting positive pressure from the outer surface of the membrane sheet 4, the water to be processed is filtrated and the filtrated water penetrated through the membrane sheet 4 is discharged from the suction port 5 via the water passing portion 3. Note that the water passing portion 3 of the support plate 1 is specially treated to have a figure through which the filtrated water can pass freely while supporting the surface of the membrane sheet 4 to prevent the attached membrane sheet 4 from sagging.

The membrane sheet 4 is called, for example, an ultrafiltration membrane or an ultrafilter membrane, and that made of synthetic resin is used in general. Also, as for the support plate 1, that made of synthetic resin, which shows a favorable joint characteristic with the membrane sheet 4, is used. It is important for the flat membrane element to ensure watertightness of the joint portion 6, so that a method of jointing the support plate 1 and the membrane sheet 4 with an adhesive is widely employed. However, the method of using the adhesive easily causes deviation in adhesive force in addition to the problems that the adhesive deteriorates easily to lower the watertightness and that leak from the lateral direction of the membrane sheet 4 is easily caused.

As a method of improving the problem in the jointing method using the adhesive, a flat-membrane-element manufacturing method in which a membrane sheet is deposited on a support plate by lapping the membrane sheet and the support plate each other and emitting a laser to the mutually jointed portion is disclosed in Japanese Patent Application Laid-Open No. 2005-279580. In this method, the membrane sheet is made of a material having larger laser penetration and the support plate is made of a material having larger laser absorption property, in which the membrane sheet is deposited on the support plate by emitting a laser from the membrane sheet side to the joint portion while pressing the membrane sheet toward the support plate. In the method disclosed in Japanese Patent Application Laid-Open No. 2005-279580, the flat membrane element in which the joint portion has strong adhesive force and the leak from the lateral direction along the adhered surface of the membrane sheet are hard to be caused, can be manufactured at relatively low costs.

The above-described flat membrane element causes an extreme clogging in the membrane sheet or the membrane sheet is damaged to be unable to hold a normal filtrating function when it filtrates the water to be processed for a long period of times. Although the spent flat membrane element over durable years as described above is normally processed or disposed as an industrial waste, it sometimes causes an environmental contamination when discarded. Further, in the flat membrane element, the material and processing costs of the support plate is overwhelmingly high as compared with the membrane sheet, and when the expensive support plate is thrown out as an industrial waste, the regeneration cost of the flat membrane element increases, posing a problem. Therefore, as a measure, it is conceivable that the membrane sheet over the durable years is pulled out and peeled from the support plate to reuse the support plate. However, the deposited portion of the membrane sheet and the support sheet which is deposited by the laser emission is rigid requiring many labor hours and costs to be pulled and peeled, being unadvisable.

As a measure improving the problem as described above, in Japanese Patent Application Laid-Open No. 2000-107576, a regeneration method of a flat membrane element by way of recovering, in which a major part of the membrane sheet (filtration membrane) other than the deposited portion is cut from a spent flat membrane element (membrane cartridge) and, after that, a new membrane sheet is adhered in a lapping manner onto the deposited portion of the membrane sheet of the former support plate (filtration plate), is disclosed.

However, the regeneration method of the flat membrane element disclosed in Japanese Patent Application Laid-Open No. 2000-107576 has a large difference in view of a fixing method of the membrane sheet between the case where a membrane sheet is deposited onto a support sheet when manufacturing a new product and the case where membrane sheets are adhered to each other when regenerating the product, causing a cost increase due to an additional manufacturing line required. Further, there arise differences between the new product and the regenerated product in view of durability and reliability, indicating a possible degradation of the regenerated product in the commercial value.

SUMMARY OF THE INVENTION

An object of the present invention is to provide a flat membrane element capable of solving the above-described problems of the conventional art and at the same time prompting reuse of the support plate, while allowing the same method for fixing a membrane sheet for both cases where a new product is manufactured and where a spent product is regenerated, so that no difference is caused between the new product and the regenerated product in durability and reliability.

A flat membrane element according to the present invention is a flat membrane element performing solid-liquid separation, including a membrane sheet for filtration, the membrane sheet being made of a synthetic resin material; a support plate to have the membrane sheet attached thereon; a deposit fixed portion formed by a circumferential edge of the membrane sheet and the support sheet which are lapped each other and laser deposited; and an embrocation having laser absorption property applied on the surface of the membrane sheet of the deposit fixed portion to cover a laser deposited portion. The same synthetic resin material as of the membrane sheet added with a pigment is acceptable for the embrocation and the membrane sheet may be attached onto a single surface of the support plate or may be attached onto both the surfaces thereof.

Further, the present invention is a regeneration method of a flat membrane element lapping a membrane sheet onto a support plate to laser deposit a circumference of the membrane sheet and covering a laser deposited portion with an embrocation having laser absorption, wherein the membrane sheet inside the laser deposited portion is cut off and a new membrane sheet is lapped onto the embrocation and a laser deposition is performed thereto to regenerate the membrane element. It is preferable that the laser deposited portion of the newly lapped membrane sheet is covered by the embrocation with laser absorption property to prepare for a next regeneration.

According to the flat membrane element and the regeneration method thereof, the embrocation having laser absorption property is applied on the surface of the membrane sheet of the deposit fixed portion. Therefore, even when regenerating the flat membrane element, the fixing of the membrane sheet by deposition with the laser emission can be performed as in the case of the new product manufacturing. Accordingly, the regeneration does not require any additional facility, so that the cost for the regeneration can be reduced. Further, the flat membrane element regenerated holds the same membrane area as of the new product, and its membrane sheet is fixed by deposition by the same method as of the new product, causing no difference in durability and reliability from the new product.

BRIEF DESCRIPTION OF THE DRAWINGS

FIGS. 3a to 3d are partial sectional side views showing regeneration procedures of a flat membrane element 10 in which FIG. 3a is a sectional view of a membrane sheet cutting off a solid-liquid separating area, FIG. 3b is a sectional view showing a state lapping a new membrane sheet, FIG. 3c is a sectional view showing a laser deposited state, and FIG. 3d is a sectional view showing a state where the replacement with a new membrane sheet is performed with respect to an opposite surface;

DETAILED DESCRIPTION OF THE PREFERRED EMBODIMENTS

Figure 1:
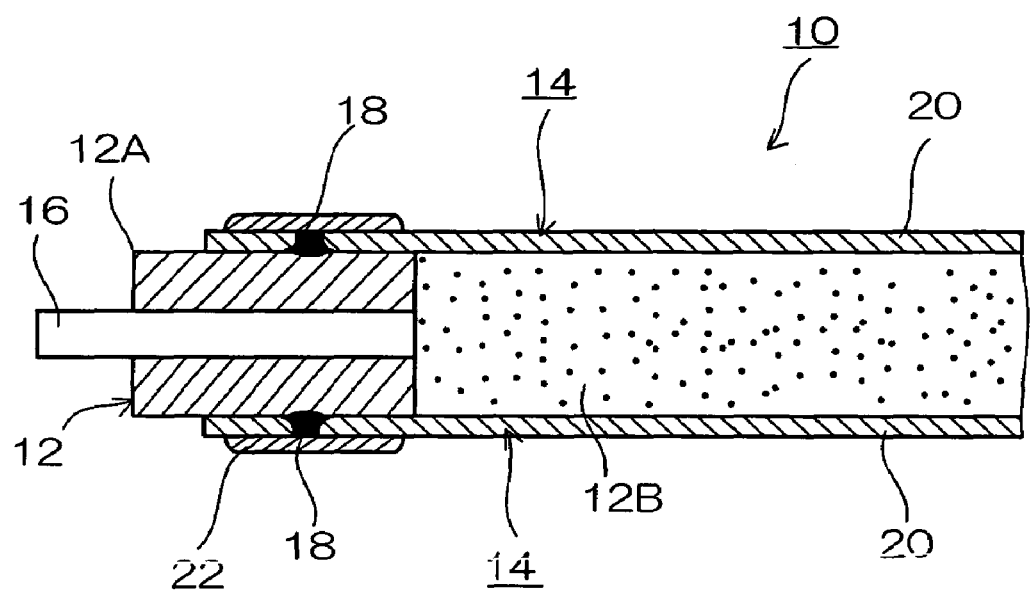
FIG. 1 is a partial sectional side view showing a first embodiment of a flat membrane element according to the present invention.
Figure 2:
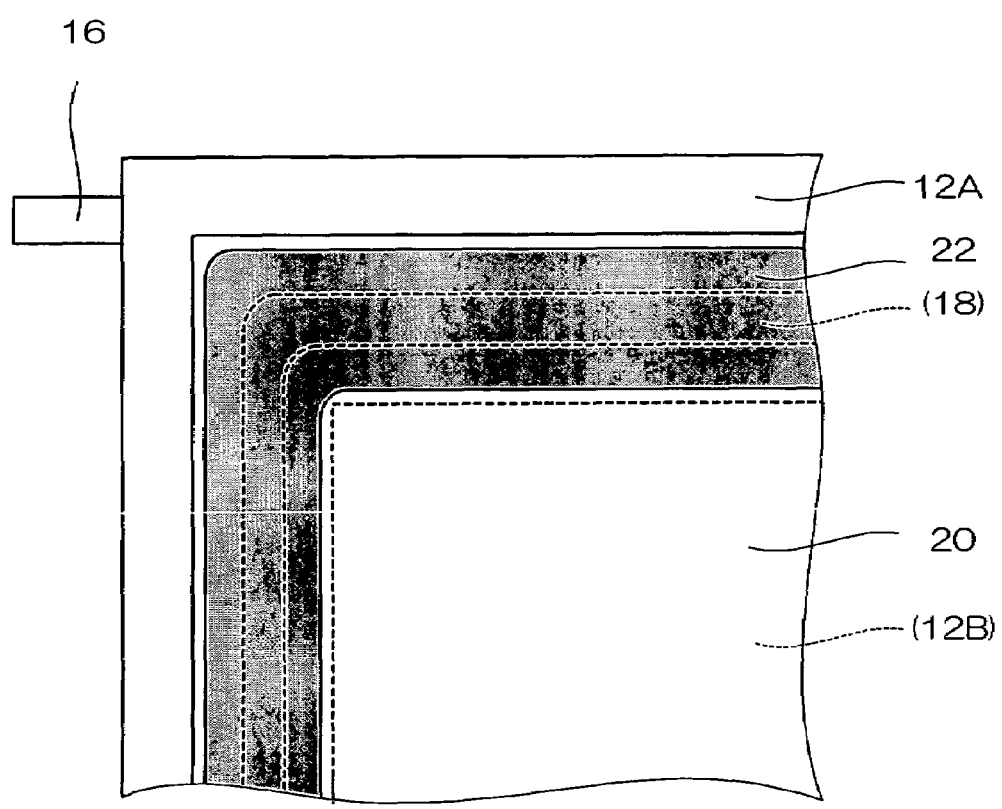
FIG. 2 is a partial plan view showing the first embodiment of the flat membrane element according to the present invention.
Figure 3:
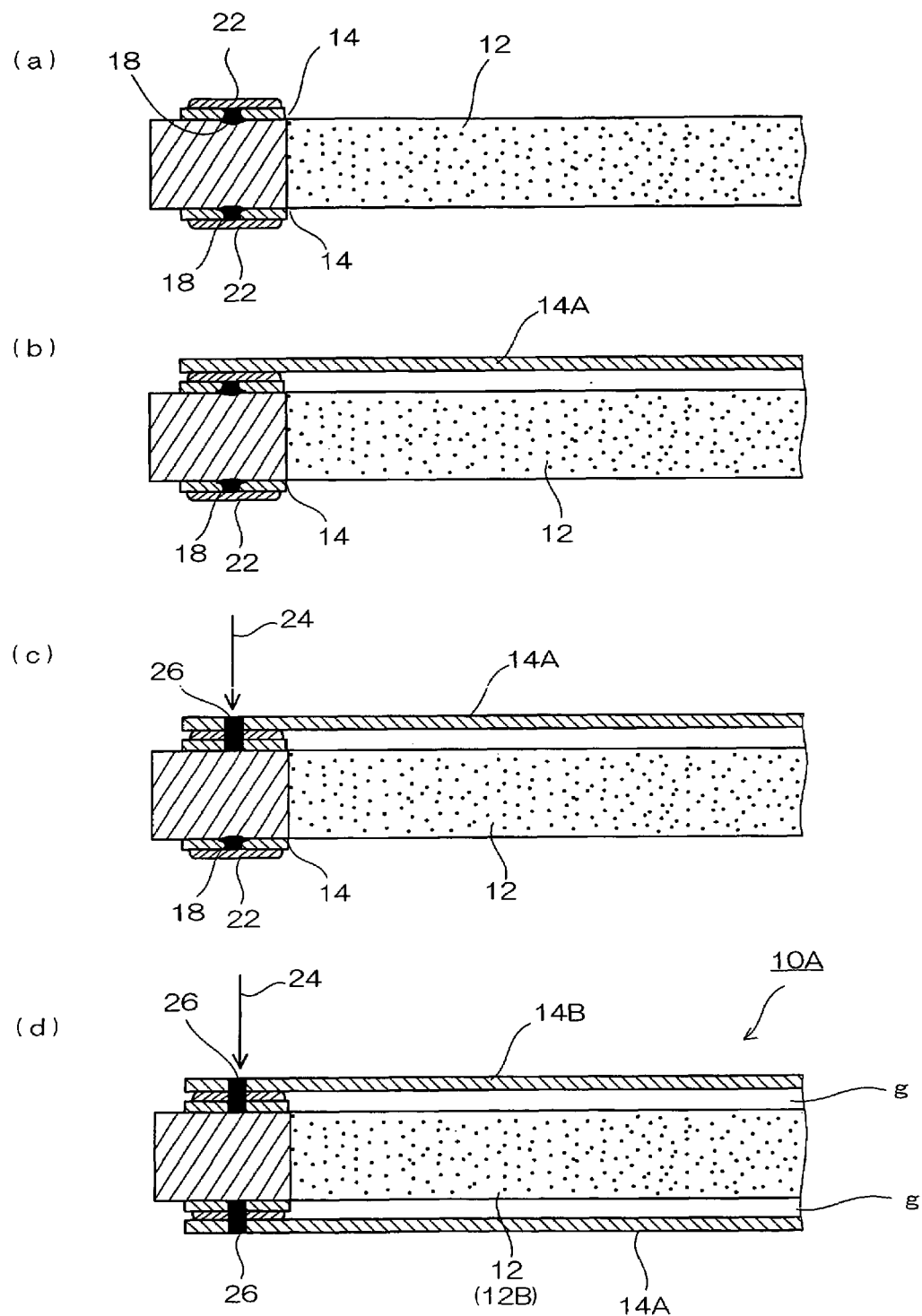

FIG. 1 is a partial sectional side view showing a first embodiment of a flat membrane element according to the present invention, and FIG. 2 is a partial plan view thereof. A flat membrane element 10 is structured to have a membrane sheet 14 attached onto each of both surfaces of a support plate 12 as in conventional one. A support plate 12 is formed such that a circumferential edge 12A thereof has a flame shape and a water passing portion 12B is formed in the inner portion thereof. A suction port 16 is connected with the circumferential edge 12A. By effecting negative pressure in the suction port 16 or by effecting positive pressure from the outer surface of the membrane sheet 14, the water to be processed is filtrated and the filtrated water permeated through the membrane sheet 14 is discharged from the suction port 16 via the water passing portion 12B. Note that the water passing portion 12B of the support plate 12 is specially treated to have a figure through which the filtrated water can pass freely while supporting the surface of the membrane sheet 14 to prevent the membrane sheet 14 attached from sagging.

The membrane sheet 14 is called for example an ultrafiltration membrane or an ultrafilter membrane, and that made of synthetic resin is used in general. Also, as for the support plate 12, that made of synthetic resin, which shows a favorable deposition characteristic with the membrane sheet 14, is used. The membrane sheet is made of a material having larger laser penetration and the support plate is made of a material having larger laser absorption property. By emitting a laser to a mutual joint portion of the circumferential edge of the membrane sheet 14 and the support plate 12, which are lapped, a deposit fixed portion 18 deposit fixing the circumferential edge portion of the membrane sheet 14 and the support plate 12 is formed. This deposit fixed portion 18 is firmly bonded and is hard to degrade, preventing a leak from the lateral direction along the joint surface of the membrane sheets 14.

An inside of the membrane sheets 14 surrounded by the deposit fixed portion 18 is a solid-liquid separating area 20, and the filtrated water penetrated through the solid-liquid separating area 20 is discharged from the suction port 16 via the water passing portion 12B as described before. An embrocation 22 having laser absorption property is applied on the surface of the membrane sheet 14 of the deposit fixed portion 18. As an embrocation 22, a synthetic resin material of the same type (for example, polyethylene, polyvinylidene fluoride, polyacrylonitrile or the like) as of the material of the membrane sheet 14 added with a pigment such as carbon black to improve the laser absorption property is preferably used. The embrocation 22 serves also as a protective member blocking and protecting the deposit fixed portion 18 against an external environment.

The flat membrane element of the above-described structure causes an extreme clogging in the membrane sheet 14 or the membrane sheet 14 is damaged to be unable to hold a normal filtrating function when it filtrate the water to be processed for a long period of times. The spent flat membrane element 10 over the durable years is regenerated by a method as will be described below. FIGS. 3a to 3d are partial sectional side views showing regenerating procedures of the flat membrane element 10. First, in the first step (FIG. 3a), of the membrane sheets 14 attached on both the surfaces of the support plate 12, portions corresponding to the solid-liquid separating area 20 shown in FIG. 1 are cut off. As a result, as shown in the drawing, only the circumferential edge portion of the membrane sheet 14 remains in the state of deposite fixed with the support plate 12 and the deposit fixed portion 18. On the surface of the remaining membrane sheet 14, the embrocation 22 remains as well. In the second step (FIG. 3b), a new membrane sheet 14A is lapped on the remaining embrocation 22. In the third step (FIG. 3c), a laser 24 is emitted from the upper surface of the lapped new membrane sheet 14A. The laser 24 penetrated through the membrane sheet 14A reaches the embrocation 22 to be absorbed thereby. Then, the embrocation 22 fuses first by heat of mixing. Subsequently, the fusion heat is conveyed to partially fuse the deposit fixed portion 18 on the lower side and the membrane sheet 14A on the upper side. After that, when the emission of the laser 24 is removed, a new deposit fixed portion 26 formed by these fused substances cured in a unified manner is formed, and the new membrane sheet 14A is firmly deposit fixed to the support plate 12. In the fourth step (FIG. 3d), after the membrane sheet 14A is positioned on the under surface of the support plate 12 by reversing the support plate 1, and the second step (FIG. 3b) and the third step (FIG. 3c) are repeated also to the new membrane sheet 14B on the other surface. By performing the above-described first to fourth steps, the regeneration of the flat membrane element 10 is completed.

Figure 4:
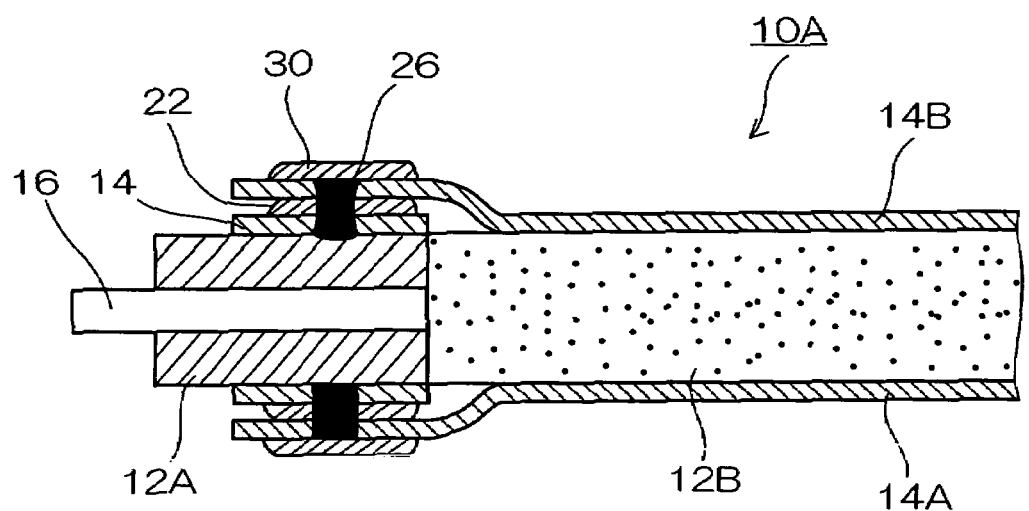
FIG. 4 is a partial sectional side view showing a state of a regenerated flat membrane element 10A in use.

In the regenerated flat membrane element 10A, between the new membrane sheets 14A, 14B and the support plate 12, there are generated spaces g having the same thickness as of the new membrane sheet 14 and the embrocation 22. However, the thickness of the membrane sheet 14 and embrocation 22 is normally several tens μm to several hundreds μm level, so that the new membrane sheet 14A, 14B have sufficient flexibility and elasticity. Therefore, as shown in FIG. 4, when suction pressure from the inside or the pressing pressure from the outside is effected in the filtration of the water to be processed, the membrane sheets 14A, 14B sag to be closely attached to the water passing portion 12B of the support plate 12. Accordingly, the spaces g are actually not obstacles.

Note that, as shown in FIG. 4, an embrocation 30 having laser absorption property is applied further onto the surfaces of the respective new membrane sheets 14A, 14B, respectively, and when the durable years of the membrane sheets 14A, 14B is over, further replacement with new membranes is possible by the same regeneration method as above. According to the review result by the present inventor, when the regeneration as described above is repeated three to five times, no particular problem is caused in practice.

As described above, according to the flat membrane element 10 and the regeneration method thereof, the embrocation 22 having laser absorption property is applied on the surface of the membrane sheet 14 of the deposit fixed portion. Therefore, also in the regeneration of the flat membrane element 10, the deposit fixing of the membrane sheet by the laser emission can be performed in the same manner as in the new product manufacturing. Accordingly, the regeneration requires no additional facility, allowing the regeneration cost to be reduced. Further, the regenerated flat membrane element holds the same membrane area as of the new product, and its membrane sheet is deposit fixed by the same method as of the new product, causing no large difference in durability and reliability from the new product.

Figure 5:
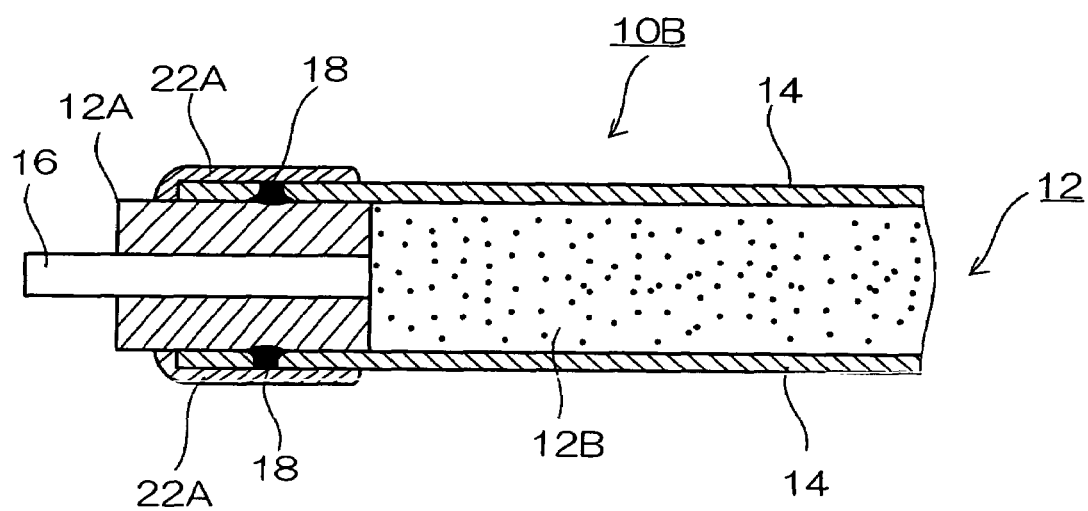
FIG. 5 is a partial sectional side view showing a second embodiment of the flat membrane element.

FIG. 5 is a partial sectional side view showing a second embodiment of the flat membrane element according to the present invention. In FIG. 5, the elements denoted by the same numerical references as in FIG. 1 are the same elements as described in the first embodiment and therefore their detailed descriptions will be omitted here. In a flat membrane element 10B according to the present embodiment, an embrocation 22A is applied largely to cover the end portion of the membrane sheet 14, and the protective function to the deposit fixed portion 18 and the end of the membrane sheet 14 is enhanced by this embrocation 22A.

Figure 6:
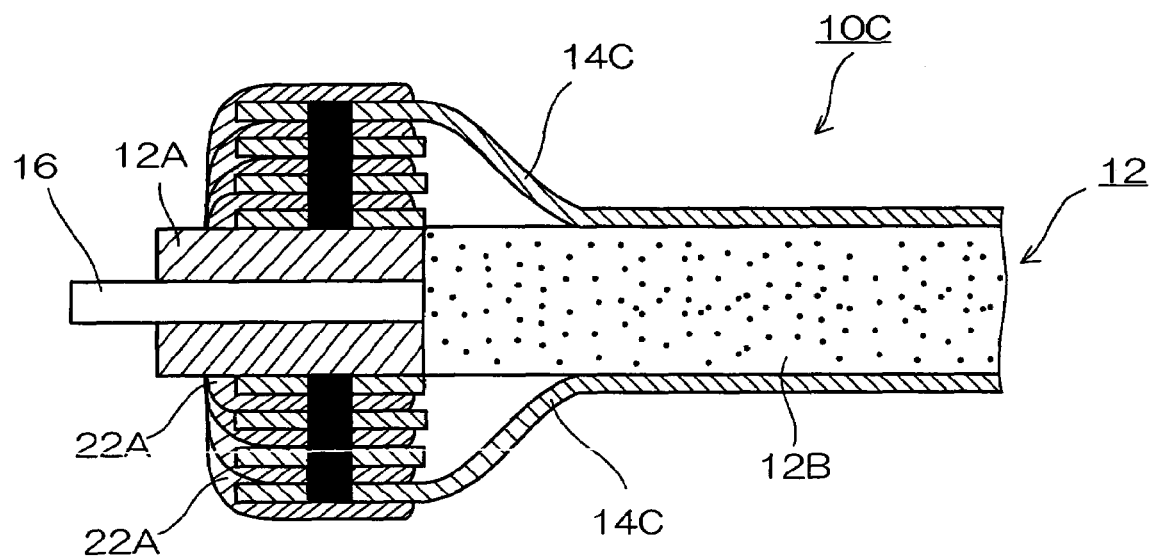
FIG. 6 is a partial sectional side view showing a third embodiment of the flat membrane element according to the present invention.
Figure 7:
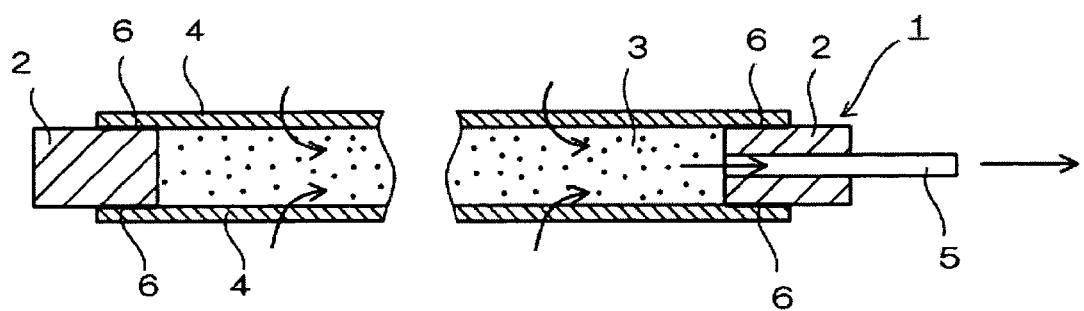
FIG. 7 is a partial sectional view showing a general structure of a flat membrane element.

FIG. 6 is a partial sectional side view showing a third embodiment of the flat membrane element according to the present invention. In FIG. 6, the elements denoted by the same numerical references as in FIG. 1 are the same elements as described in the first embodiment and therefore their detailed descriptions will be omitted here. In a flat membrane element 10C according to the present embodiment, the embrocation 22A is applied largely to cover the end portion of the membrane sheet 14 as in the second embodiment, and the state after the regenerations performed three times is shown in the drawing.

What is claimed is:

1. A solid-liquid separation flat membrane element, comprising:
    a membrane sheet for filtration, the membrane sheet comprising a synthetic resin material;
    a support plate having a first and a second surface, the membrane sheet being attached onto the first surface;
    a deposit fixed portion formed by laser deposition of a circumferential edge of said membrane sheet and said support plate, which are lapped upon each other; and
    an embrocation having a laser absorption property and being applied on the surface of the deposit fixed portion, the embrocation comprising a same synthetic resin material as of said membrane sheet, and a pigment mixed therein.

2. The flat membrane element according to claim 1, further comprising:
    a second membrane sheet attached onto the second surface of said support plate.

* * * * *